Dec. 11, 1962 J. MÜLLER ET AL 3,068,020
WHEEL SUSPENSION FOR VEHICLES
Filed Aug. 17, 1959 4 Sheets-Sheet 1
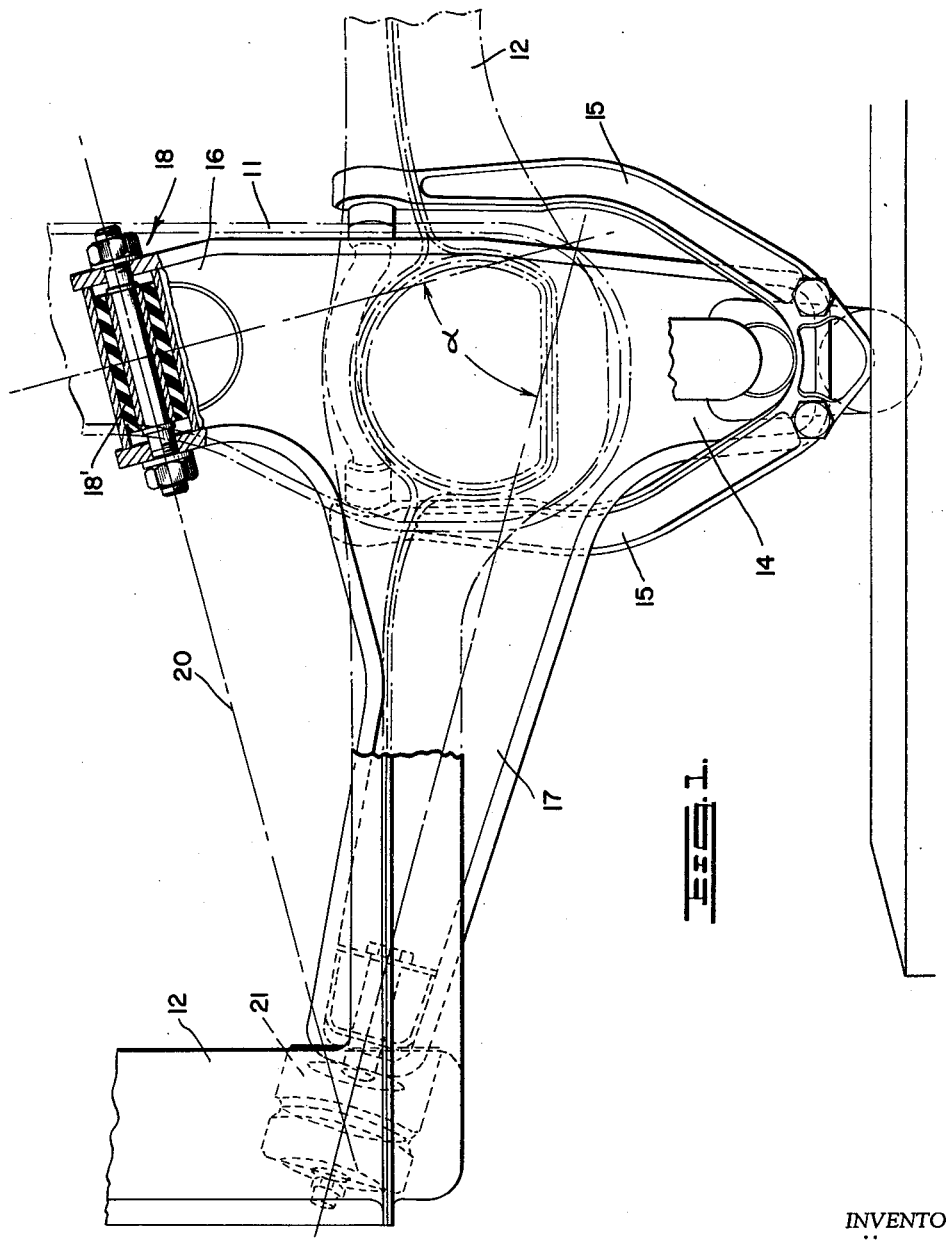
INVENTORS
JOSEF MÜLLER
FRIEDRICH H. VAN WINSEN
BY Dicke, Craig and Freudenberg
ATTORNEYS

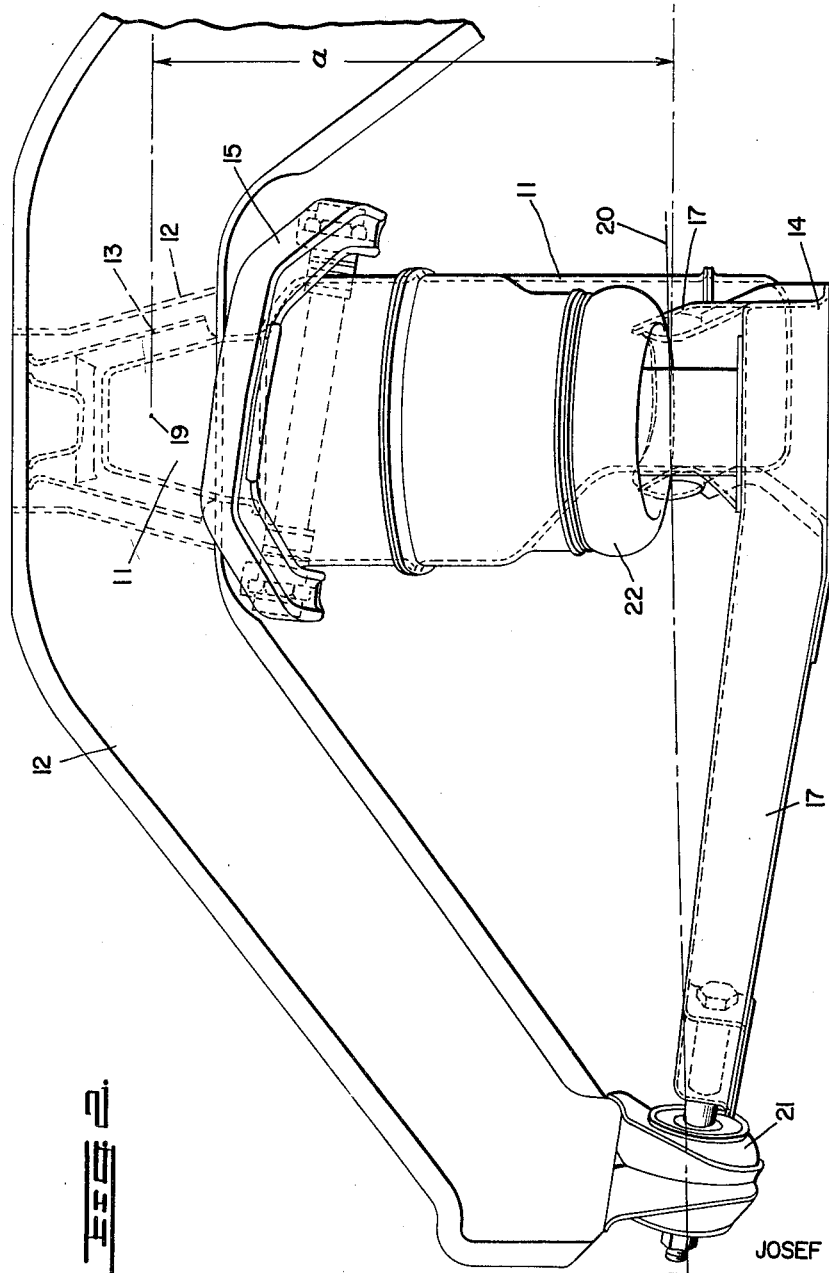

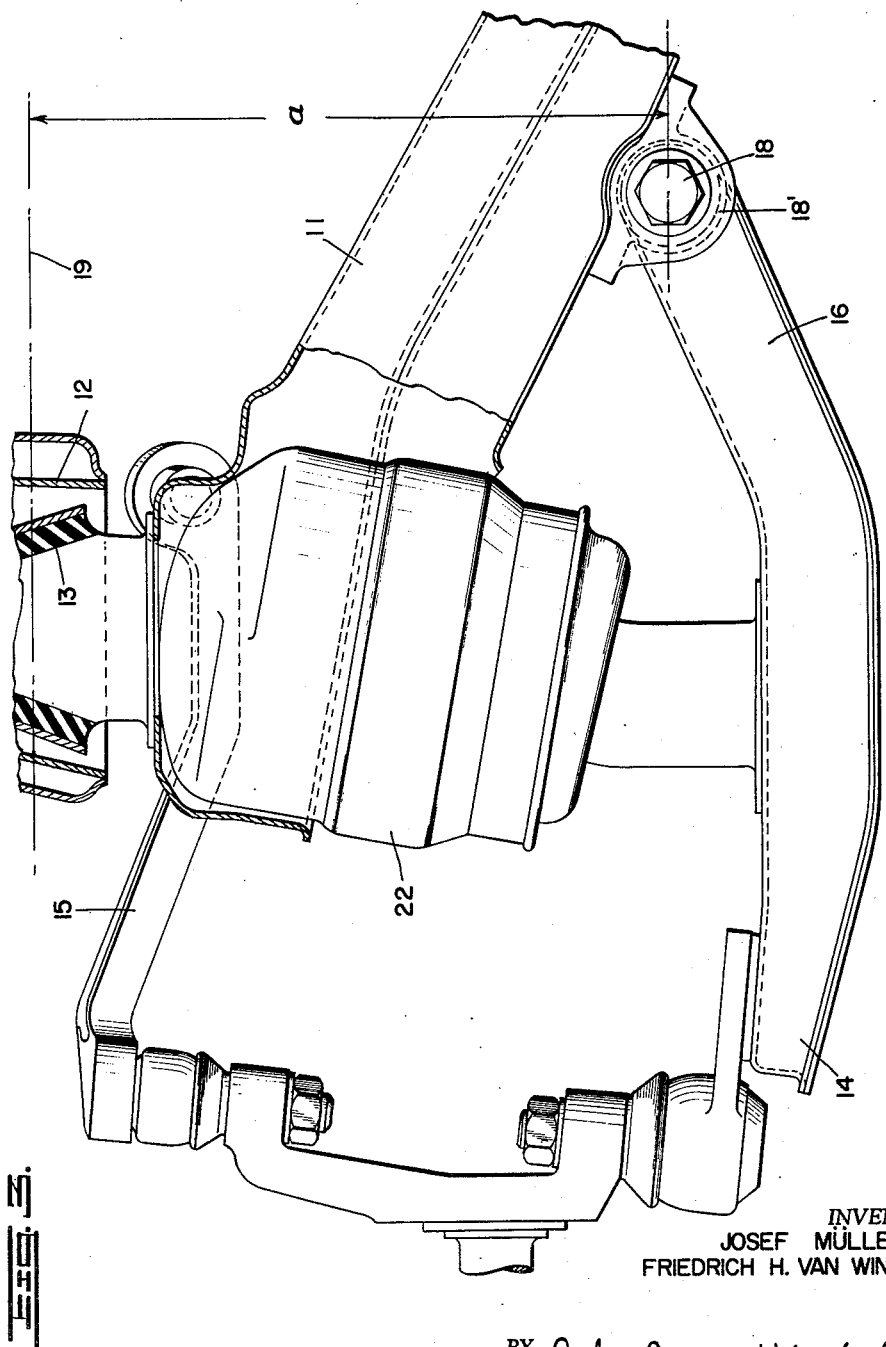

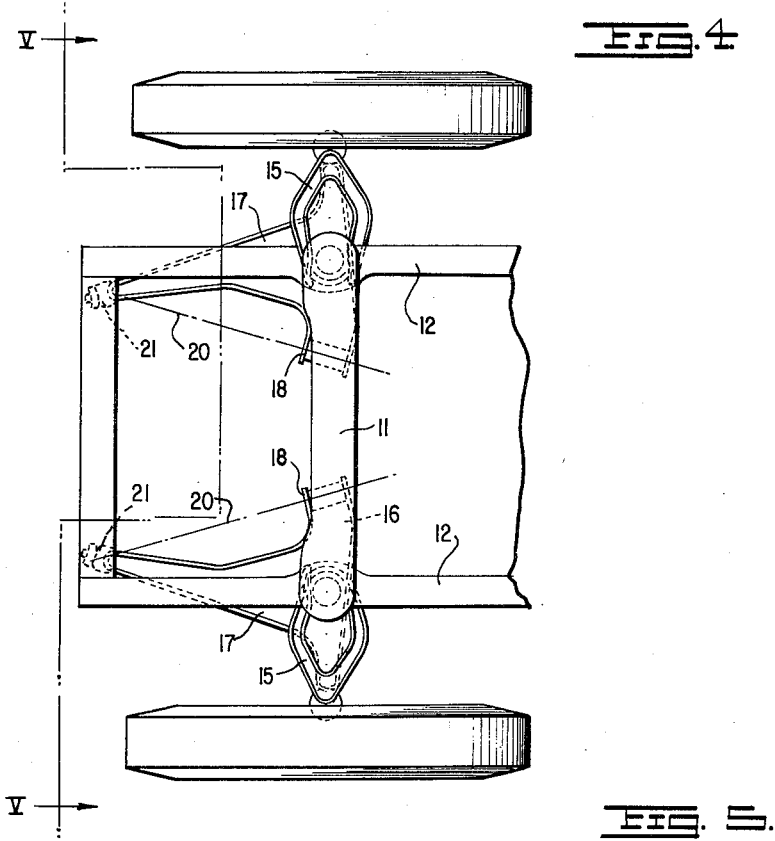
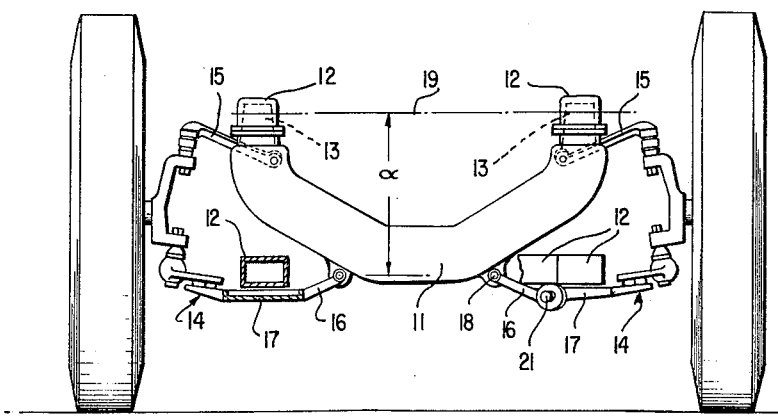

United States Patent Office 3,068,020
Patented Dec. 11, 1962

3,068,020
WHEEL SUSPENSION FOR VEHICLES
Josef Müller, Stuttgart-Riedenberg, and Friedrich H. van Winsen, Kirchheim, Teck, Germany, assignors to Daimler-Benz Aktiengesellschaft, Stuttgart-Unterturkheim, Germany
Filed Aug. 17, 1959, Ser. No. 834,297
Claims priority, application Germany Aug. 20, 1958
2 Claims. (Cl. 280—106.5)

The present invention relates to a front wheel suspension, especially for motor vehicles in which the main frame or vehicle body, for example, of a self-supporting type vehicle body, is elastically supported or mounted on an auxiliary frame carrying the wheel suspension members and wheel spring system at only two places, namely, at one place on each side of the vehicle longitudinal center plane.

It is known in the prior art in motor vehicles to utilize an essentially flat or planar, approximately horseshoe-shaped auxiliary frame which carries the wheel suspension and wheel springs. Such prior art horeshoe-shaped auxiliary frame is elastically connected at three points with the main frame so that the moments which occur during braking are transferred or transmitted through the auxiliary frame to the main frame. By reason of the relatively considerable forces caused by braking, which subject the flat or planar auxiliary frame to bending forces or stress, such auxiliary frame has to be made relatively sturdy and constructed of relatively large dimensions, whereby the auxiliary frame becomes relatively large and bulky and also of relatively large weight.

It has, therefore, been proposed already, for example, in the co-pending application Ser. No. 821,741, filed on June 22, 1959, in the name of Josef Mueller, Karl Wilfert and Ernest J. W. Fiala and entitled "Wheel Suspension" and assigned to the assignee of the instant application, to elastically connect the auxiliary frame with the main frame at only two points and to brace or additionally support the auxiliary frame with respect to the main frame by separate, auxiliary struts or bracing support members which are arranged at a distance effective as lever arm from the straight line passing through the two bearing places of the main frame. These auxiliary bracing or support members which are elastically connected with the auxiliary frame either above or below the straight line passing through the two bearing places of the main frame, on the one hand, extend approximately horizontally and, on the other, are elastically and pivotally connected at the main frame of the vehicle body so that under load they are stressed either in tension or compression or breaking but not in bending. Consequently, the special auxiliary strut or brace members may be constructed of relatively light weight.

However, even with these last-mentioned prior art constructions, there arises the operational disadvantage that all of the forces acting on the wheels of the vehicle and all of the moments emanating from the wheels such as shocks caused by road obstacles and/or braking moments, have to be initially absorbed in their full magnitude through the wheel suspension by the auxiliary frame and subsequently are transmitted onto the main frame.

It is known that generally only one component of the road-obstacle shock is elastically absorbed, determined by the direction of the wheel stroke. The other horizontal force component passes over in an unsprung manner through the wheel suspension into the auxiliary frame. This condition is particularly unfavorable with wheels suspended by means of transverse guide members because this component acts on the wheel suspension members approximately vertically which are thereby loaded in bending. Consequently, the guide members have to be mounted or supported at the auxiliary frame over as wide a base as possible whereby, in turn, the auxiliary frame has to be increased spatially in an unfavorable manner. Furthermore, the reaction forces emanating from the wheel suspension pass over into the auxiliary frame in the full magnitude thereof through the transverse guide members supported at the auxiliary frame. Moreover, the braking moments have to be absorbed by the auxiliary frame through the bearing supports of the transverse guide members over a relatively narrow base.

In order to satisfy the afore-mentioned requirements and operating conditions and simultaneously therewith to eliminate the existing afore-mentioned disadvantages encountered in the prior art constructions, it is proposed in accordance with the present invention to pivotally connect the wheel suspension members or only a part thereof, for example, with a suspension of the wheel by means of lower and upper guide members, particularly only the lower guide members, on the one hand, at the auxiliary frame at a distance effective as lever arm from or below the straight line passing through the two bearing supports of the main frame and, on the other, at the main frame or vehicle body.

According to a further feature in accordance with the present invention, it is proposed to construct the lower transverse guide member as a two-armed member whereby one arm acts on or is operatively connected with the auxiliary frame and the other arm acts on or is operatively connected with the main frame, and whereby both guide arms of the lower guide member possess a common pivot axis which extends essentially in the vehicle longitudinal direction and substantially horizontally.

The guide arm portion pivotally secured at the auxiliary frame may thereby extend in the direction of the auxiliary frame and may form an acute angle with the other guide arm portion operatively connected with the main frame. The angle between the two guide arm portions amounts, in accordance with the present invention, to approximately 30° to 50° whereby the guide arm portion operatively connected with the main frame extends a relatively large distance in the forward or rearward direction of the vehicle.

According to a further refinement of the main inventive concept of the present invention, it is proposed to undertake the connection between the one guide arm portion and the auxiliary frame by means of a simple pivot bearing offering kinematically one degree of freedom of movement with the entire lower guide member pivoting or swinging about the longitudinal axis of this pivot bearing, whereas the other guide arm is operatively connected with the main frame over a ball-joint, preferably an elastically constructed universal joint with the longitudinal axis of the pivot bearing extending through the center of the universal joint whereby the universal joint is constructed to be more elastic or yielding in the direction of the last-mentioned guide arm portion than in the other direction. Moreover, the pivot bearing may also be constructed elastically.

It is also understood that the possibility exists within the frame and scope of the present invention to arrange the pivot axis or axes of the wheel suspension members, i.e., of the upper and lower transverse guide members, and therewith also the plane of the lower guide member not only horizontally but, instead, the afore-mentioned axes may also extend at an angle under an inclination with respect to the horizontal or may form an angle with respect to each other, and simultaneously therewith may be directed at an incline with respect to the vehicle longitudinal center plane in order to improve, in the first instance, the shock-absorbing ability and capacity thereof and, furthermore, to obtain an erecting moment during braking. Furthermore, the present invention also includes the possibility of utilizing a lower transverse guide member and simultaneously therewith an upper longitudinal guide member as wheel suspension.

A considerably more favorable absorption and distribution of the forces and moments acting on the wheels is achieved by the present invention. The unsprung horizontal component acting on the wheel as absorbed primarily by the guide arm portion operatively connected with the main frame which guide arm portion, in a very advantageous manner, is thereby primarily loaded in tension as regards rigidity thereof. However, the braking moments are also transmitted directly to the main frame by this guide arm portion. The relatively long lever arm of this guide arm portion is thereby effective in a particularly advantageous manner since the "force" factor of the moment is considerably reduced thereby. An elastic or resilient force absorption in all directions is produced thereby with a construction of the bearing support between the guide arm and the main frame as elastic universal joint.

The pivot bearing between the guide arm portion arranged at the auxiliary frame and the auxiliary frame produces a favorable specific force-absorption in the transverse direction by reason of its relatively wide dimensioning and an unobjectionably guidance of the guide member with respect to the pivot axis. In particular, a widened base both with respect to the bearing of the wheel suspension as well as also with respect to the support of the auxiliary frame is produced in accordance with the present invention. This advantageous characteristic becomes effective in an advantageous manner as to all structural parts and members insofar as construction and weight thereof are concerned. However, in particular, the auxiliary frame may be constructed less sturdy and bulky and also thinner and more slender which creates space for other structural elements which have to be accommodated thereat or in proximity thereto within the engine space. For example, the steering gear may be advantageously arranged at the auxiliary frame. Furthermore, it is possible to arrange the steering rods displaced far-reachingly toward the axles so that favorable steering conditions may be attained thereby. No special bulky auxiliary support or bracing members are necessary for supporting the auxiliary frame elastically connected with the main frame by means of only two bearing supports. On the other hand, the guide arm extending in the direction of the main frame in no way disturbs or impairs the arrangement because ordinarily the position of this guide arm which is relatively low is not occupied by any other structural parts. Furthermore, the construction according to the present invention, entails a reduction in cost of manufacture because the two-armed lower guide member may be made of stamped or pressed-out sheet metal parts which necessitates relatively lesser expenditures both as to machining and cost of materials as compared to the known relatively large-space auxiliary frame constructions and the multi-partite auxiliary supports proposed in connection therewith.

Finally, a more simple construction of the auxiliary frame is achieved by the present invention which, in the constructions utilized heretofore in the prior art, was loaded or stressed relatively heavily particularly within the region of the pivotal connections and bearing spaces.

Accordingly, it is an object of the present invention to provide a wheel suspension including an auxiliary frame which obviates the disadvantages noted hereinabove in connection with the prior art constructions.

Another object of the present invention is the provision of a wheel suspension for independently-suspended wheels in connection with an auxiliary frame from which the wheels are suspended which materially reduces the expenditures thereof both as regards cost of materials and cost in manufacture and assembly.

A further object of the present invention is the provision of an auxiliary frame carrying thereon the wheel suspension which auxiliary frame is elastically supported at the main frame at only two places and which obviates the need for separate auxiliary brace or support members in addition to the two elastic bearing supports.

A further object of the present invention resides in the provision of a wheel suspension utilizing transverse guide means which provides a favorable spatial arrangement of the wheel suspension within the engine space thereby leaving a relatively larger amount of space for other auxiliary devices such as the steering gear or the like.

Another object of the present invention is the provision of a wheel suspension including a transverse guide member suspended from an auxiliary frame which assures satisfactory and unobjectionable absorption of all the forces and moments that may occur at the wheel without unduly stressing the auxiliary frame or the bearing supports.

These and other objects, features and advantages of the present invention will become more obvious from the following description when taken in connection with the accompanying drawing which shows, for purposes of illustration only, one embodiment in accordance with the present invention, and wherein:

FIGURE 1 is a top plan view of a part of a front wheel suspension of a motor vehicle, in accordance with the present invention, FIGURE 2 is a side-elevational view of the wheel suspension illustrated in FIGURE 1, FIGURE 3 is an end view, in elevation of the wheel suspension illustrated in FIGURE 1, taken from the rear in the direction of the wheel suspension members and auxiliary frame, FIGURE 4 is a schematic top plan view of the wheel suspension in accordance with the present invention, and FIGURE 5 is a frontal view of the suspension illustrated in FIGURE 4 taken along section line V—V of FIGURE 4 omitting the main springs for clarity.

Referring now to the drawing wherein like reference numeral are used throughout the various views thereof to designate like parts, reference numeral 11 designates therein the auxiliary frame and reference numeral 12 designates the main frame which frames are joined by means of elastic bearings 13 of which only one is shown in the drawing. In actual construction, two such elastic bearing supports 13 are used, one on each side of the central longitudinal plane of the vehicle. The elastic bearing supports 13 may be of any suitable construction known in the prior art.

The wheel suspension takes place by means of a lower transverse guide member 14 and an upper transverse guide member 15. It is also understood that any other known types of wheel suspension members or guide arms may be used in the place of the guide arm illustrated herein. The lower transverse guide member 14 includes two arm portions 16 and 17. The guide arm portion 16 extends in the direction of the auxiliary frame 11 and is pivotally supported thereat in any suitable manner. The other guide arm portion 17 subtends with the arm portion 16 an acute angle α between 30° to 50° and is supported forwardly at the main frame 12. The bearing support 18 of the guide arm portion 16 is located at a distance $a$ effective as lever arm below the straight line 19 passing through the two oppositely disposed bearing places 13.

As shown in FIGURE 1, the bearing support of the guide arm portion 16 operatively connected with the auxiliary frame 11 consists of a pivot bearing 18 in which an elastic body 18' is arranged, in a manner known per se, between two metallic sleeves or bushings.

The longitudinal axis 20 of the pivot bearing support 18 extends through the center point of a bearing 21 constructed as an elastic universal joint disposed between or operatively connecting the guide arm portion 17 and the main frame 12, whereby the elastic universal joint 21 is constructed to be more elastic or yielding in the direction of arm 17 than in the transverse direction.

Reference numeral 22 designates a suitable spring element, for example, a pneumatic spring bellows of a pneumatic spring, though it is understood than any other suitable spring element may be used in its place.

It is understood that the wheel suspension for the oppositely disposed wheel is constructed in a mirror-image-like manner to that illustrated and described herein.

The term "vehicle superstructure" is used herein to describe the relatively stationary part of the vehicle such as the frame or vehicle body, for example, of a self-supporting type vehicle.

While we have shown and described one embodiment in accordance with the present invention it is understood that the same is not limited thereto but is susceptible of many changes and modifications within the spirit and scope of the present invention and we therefore do not wish to be limited to the details shown and described herein but intend to cover all such changes and modifications as are encompassed by the scope of the appended claims.

We claim:

1. A front wheel suspension for motor vehicles having a pair of oppositely disposed front wheels comprising, a vehicle main frame, an auxiliary frame elastically supported from said vehicle main frame at only two places one on each side of the vehicle longitudinal center plane, independent wheel suspension means including an upper guide member and a lower guide member for suspending a respective front wheel from said auxiliary frame, said lower guide member including two guide arm portions, bearing means pivotably connecting one of said guide arm portions with said auxiliary frame at a distance below the straight line passing through said two bearing places, and universal joint means for connecting the other of said guide arm portions with said vehicle main frame, said other guide arm portion extending essentially longitudinally of the vehicle to thereby effectively brace said auxiliary frame, the pivot axis of said bearing means extending essentially through the center of said universal joint means.

2. A front wheel suspension according to claim 1, wherein said two guide arm portions subtend an acute angle therebetween.

References Cited in the file of this patent

UNITED STATES PATENTS

| | | |
|---|---|---|
| 2,105,132 | Soehner | Jan. 11, 1938 |
| 2,112,981 | Best | Apr. 5, 1938 |
| 2,372,744 | Sherman | Apr. 3, 1945 |
| 2,611,627 | Reynolds | Sept. 23, 1952 |
| 2,660,449 | MacPherson | Nov. 24, 1953 |
| 2,751,992 | Nallinger | June 26, 1956 |